United States Patent [19]

Ritchey

[11] Patent Number: 4,560,718

[45] Date of Patent: Dec. 24, 1985

[54] HIGH SWELL GASKET MATERIAL

[75] Inventor: Stephen Ritchey, North Vernon, Ind.

[73] Assignee: Cummins Engine Company, Inc., Columbus, Ind.

[21] Appl. No.: 681,081

[22] Filed: Dec. 13, 1984

Related U.S. Application Data

[63] Continuation of Ser. No. 517,449, Jul. 26, 1983.

[51] Int. Cl.$^4$ .................. C08L 1/00; C08L 9/10; C08K 3/40; F02F 1/10
[52] U.S. Cl. ........................ 524/13; 524/35; 524/494; 524/571; 428/375; 428/392; 428/393; 428/394; 428/395; 285/DIG. 11; 277/235 B; 123/41.72
[58] Field of Search ............ 524/13, 27, 35, 494, 524/571; 428/364, 370, 375, 392, 393, 394, 395; 123/41.72; 277/235 B; 285/DIG. 11; 217/109

[56] References Cited

U.S. PATENT DOCUMENTS

| | | | |
|---|---|---|---|
| 3,398,111 | 8/1968 | Willis | 524/571 |
| 3,929,715 | 12/1975 | Nowell et al. | 524/571 |
| 3,931,094 | 1/1976 | Segal et al. | 524/494 |
| 3,988,227 | 10/1976 | Eldred | 524/571 |
| 4,285,756 | 8/1981 | Elmer | 524/510 |
| 4,317,575 | 3/1982 | Cavicchio | 524/35 |
| 4,387,178 | 6/1983 | Tracy et al. | 428/395 |
| 4,423,109 | 12/1983 | Greenman et al. | 428/291 |

*Primary Examiner*—John Kight
*Assistant Examiner*—Nathan M. Nutter
*Attorney, Agent, or Firm*—Sixbey, Friedman & Leedom

[57] ABSTRACT

A gasket composition which will swell but not degrade in contact with hydrocarbon oil containing fluids in internal combustion engines comprises a fibrous system and an ethylene propylene rubber binder therefor. Desirably, the fibrous system comprises from 50 to 90% by weight of the composition and is selected from asbestos and aromatic polyamide fibers and the binder is an EPDM.

6 Claims, No Drawings

HIGH SWELL GASKET MATERIAL

This application is a continuation of application Ser. No. 517,449, filed July 26, 1983.

DESCRIPTION

TECHNICAL FIELD

The present invention relates to elastomeric gasket compositions and, more particularly, to high swell gasket compositions for use in contact with hydrocarbon oil containing fluids in internal combustion engines.

BACKGROUND ART

A gasket is a material which is clamped between adjacent faces and acts as a static seal. Its use is prevalent in internal combustion engines wherein its primary functions are, first, to create a seal so that engine fluids, e.g., oils, fuels and coolants, within the engine cannot escape while at the same time to keep outside dirt and other contaminants from entering the engine (and other segments of the drive lines and associated components) and, second, to maintain this sealed condition during the service life of the engine. Depending upon its particular application, gasket materials may be required to resist extreme high and/or low temperatures, elevated pressures and/or vacuum, thermal expansion, high or low bolt torques, a variety of chemical compounds and severe environmental conditions. To accomplish these many and varied tasks a wide selection of materials have been employed over the years for gasketing purposes including cork, paper, metal, plastics, natural and synthetic elastomers and various fibrous materials, such as asbestos, mineral, cellulose and polymer.

Gasketing materials for use in internal combustion engine applications involving prolonged exposure to hot oils, and other hydrocarbon fluids must, in addition to exhibiting acceptable oil aging characteristics be temperature, pressure and chemical resistant and possess adequate strength properties such as compressibility and crush resistance. It is frequently desirable that such gasketing materials swell when exposed to hot oil to provide improved sealing even under low compressive loads. Such materials typically comprise elastomeric bonded fibrous compositions and find utility in such applications as head gaskets, valve cover gaskets, rocker housing gaskets, oil pan gaskets, front cover gaskets, water pump and other coolant system gaskets and fuel pump and other fuel system gaskets. The fibrous portion of the composition imparts strength; the elastomeric component gives it resilience and conformability. Notwithstanding that gasket manufacturers may select the elastomeric binder from a wide variety of natural and synthetic rubbers which are commonly in use and exhibit at least some of the desired characteristics, none display all of these properties, particularly resistance to oil degradation over a prolonged period of time. Currently available and commonly used high swell gasket materials use natural and/or SBR rubber binders, both of which swell but also severely degrade upon prolonged exposure to hot oil.

New concepts in internal combustion engine design, resulting, for example, in low flange loads, have made it very difficult to obtain a sealed joint without utilizing either a high swell gasket composition or elastomeric stress risers on a nonswelling gasket material. Experience has shown that upon prolonged exposure to hydrocarbon oil containing engine fluids, such as lubricating oil, diesel fuel, and the like, currently available high swell gasket materials eventually degrade resulting in high mileage failures. A similar problem exists with elastomeric stress risers which also exhibit severe degradation when continuously exposed to hydrocarbon oil containing engine fluids.

It is, therefore, the purpose of the present invention to overcome previously encountered problems and to provide a high swell gasket composition which swells in contact with hydrocarbon oil containing engine fluids in order to provide a seal even under low flange loading but which does not degrade upon prolonged exposure to such fluids. Desirably, such a gasket composition, in addition, holds up well under either high or low temperature conditions and exhibits high compressive strength, e.g., is crush resistant, to avoid extruding when subjected to high loading.

DISCLOSURE OF THE INVENTION

In one aspect of the present invention this is accomplished by providing a high swell gasket material comprising a fibrous material and an ethylenepropylene elastomeric binder therefor.

In another aspect of the present invention a gasket material is provided which will swell but not degrade on prolonged exposure to hydrocarbon oil containing internal combustion engine fluids, such as lubricating oil, the gasket material comprising a major proportion by weight of a fibrous material and an ethylene-propylene-diene interpolymer elastomeric binder therefor.

In still another aspect of the present invention there is provided in an internal combustion engine including adjacent surfaces having a sealing gasket therebetween for sealing against leakage and/or contamination of hydrocarbon oil containing engine fluids thereacross, a high swell gasket comprising a fibrous material and an ethylene-proplyene rubber binder therefor, the fibrous material being chosen to suit the particular gasket application and typically selected from the group consisting of glass fibers, mineral fibers, cellulosic fibers, polymeric fibers, and mixtures thereof.

BEST MODE FOR CARRYING OUT THE INVENTION

The gasket composition of the present invention, in its broad form, comprises a fiber system bound together by an elastomeric binder. The fibers contribute to or impart temperature resistance, strength, compressibility and crush resistance to the gasket composition allowing the gasket composition to function as a seal at temperatures above 200° F. and at flange pressures at least as high as 10,000 psi. The elastomeric binder is incorporated into the fiber system to allow the gasket composition to remain elastic and resilient throughout its service life, to seal the porosity of the fiber system and to impart and contribute resistance to degradation caused by operating environmental conditions such as high and/or low temperatures, coolant chemicals and hydrocarbon oils. The gasket composition of the present invention must not only be hydrocarbon oil resistant to avoid degradation upon prolonged exposure thereto it also must have an affinity therefor which causes the composition to be oil swellable, thereby to increase in thickness and to create an enhance positive sealing pressure during operation.

The fiber system may be selected from any known useful gasket fiber and from many fibers not heretofore generally employed in gasket compositions. Thus, the fibers useful in the present invention may include asbestos, other mineral fibers, glass fibers, polymeric fibers, e.g., aramids, cellulosic fibers, other organic or inorganic fibers, and mixtures of the foregoing. The primary purpose of the fibers, which comprise the bulk of the gasket composition, is to impart high temperature capability and strength, such as crush resistance, to avoid the gasket extruding under high compressive load. The particular fiber or combination of fibers selected depends primarily upon two factors, suitability for the particular purpose and economics. For uses which are not too terribly demanding various types of mineral or cellulosic fibers may be suitable. However, experience indicates that for long term, reliable operation and functioning as a seal in internal combustion engine environments asbestos is an important and useful, perhaps the most desirable, fiber for gasket compositions due to its physical characteristics, which allow it to function under severe operating conditions, and its relatively low cost. However, in view of the growing concern for the effects of asbestos upon health, governmental regulations and restrictions regarding its use and relating to exposure thereto may effectively limit, or at some future time entirely preclude, its use. A suitable and desirable alternative to asbestos are the aromatic polyamide fibers, such as Nomex and Kevlar, both available from the E. I. duPont de Nemours Company. See, for example, U.S. Pat. Nos. 3,572,397 and 4,048,362. Kevlar is a well known high strength reinforcement fiber for elastomeric materials having tensile strength similar to steel with a density 0.2 times that of steel. Chemically, Kevlar is poly(p-phenylene terephthalamide). Nomex is a special high temperature resistant fiber which also is useful as a reinforcing fiber in elastomeric materials. Chemically, Nomex is poly(m-phenylene terephthalamide) and is believed to be formed by the copolymerization of meta-phenylenediamine and isophthaloyl chloride.

The elastomeric binder of the present invention is ethylene-proplyene rubber, a co- or terpolymer characterized by very low specific gravity, high tensile strength, excellent precent elongation, high operating temperature capability, low brittle point, very low compression set and high tear strength. The composition of most commercial ethylene propylene rubbers varies fom 60 to 85 mole percent ethylene. The spine of the ethylene/proplyene chain is saturated, i.e., there are no double bonds. This absence of carbon-carbon unsaturation makes the rubber inherently resistant to degradation by heat, light, oxygen and ozone. Ethylene/propylene rubbers which include some carbon-carbon unsaturation and which are, therefore, sulfur vulcanizable are particularly useful. Such rubbers include a small amount of an appropriate diene monomer the terminal double bond of which is active with respect to polymerization while the internal unsaturation is passive to polymerization but remains in the resulting terpolymer as a branch or pendant substituent location for active sulfur vulcanization. Since the double bond which remains is not in the polymer spine but external to it, the outstanding resistance of ethylene/propylene rubbers to degrading attack by heat, light, oxygen and ozone is inherent in the terpolymer, known as EPDM for ethylene-propylene-diene-methylene. Generally, from 4% to 10% by weight of diene is incorporated into EPDM with 4% to 5% by weight generally sufficient to provide a useful product.

There are two commercially important classes of dienes useful in the manufacture of EPDM for gasket compositions in accordance with the present invention—the nonconjugated straight chain diolefins and the cyclic and bicyclic dienes. A significant straight chain diolefin is 1,4 hexadiene which polymerizes at its terminal double bond to form the terpolymer ethylene propylene 1,4 hexadiene. Bicyclic dienes used to introduce unsaturation into ethylene propylene rubber are the various derivatives of norbornene, e.g., dicyclopentadiene, methylene norbornene and ethylidene norbornene, the latter being probably the most widely used.

The inherent properties of ethylene propylene rubber suggests that this material finds very wide application in elastomeric materials subjected to all sorts of environments. It, however, is notoriously well known to have poor resistance to hydrocarbon oils and its use in contact with such oils is consistently contra indicated. See, for example, *Rubber Technology*, Chapter 9, pp. 232,235 (Table 9.6); *The Vanderbilt Rubber Handbook*, page 154 (Table II). In accordance with the present invention, however, it has been found that when employed as an elastomeric binder for a fiber system in a gasket material ethylene propylene rubber provides a high swelling material which exhibits long term durability and improved sealability at a reasonable cost. Most importantly, there is no observable degradation of the elastomeric binder even after prolonged exposure to hydrocarbon oil containing fluids such as are present in internal combustion engines. By contrast, presently used high swell gasket materials such as natural rubbers and SBR elastomers will degrade severely after long term exposure to hydrocarbon oils and evidence this degradation by a loss of sealing load.

The gasket material of the present invention comprises, in a preferred form, predominantly fibrous material by weight and an ethylene propylene rubber binder therefor. Generally, the fiber system comprises from 50 to 90% by weight of the gasket material and the ethylene propylene binder comprises from 10 up to 50% by weight. A particularly preferred form of the material comprises 75% by weight fibers selected from asbestos, polyaramid (desirably Kevlar) and mixtures thereof and 25% by weight EPDM. Such a gasket material has superior air and high temperature resistance over other high swell elastomers, exhibits excellent air and coolant aging characteristics, shows negligible leakage at low, less than 50 psi, flange pressures and ensures excellent long term hydrocarbon oil sealing capabilities with no degradation to cause a loss of sealing load. It may be made by any number of well known techniques, including the so-called compressed process wherein the fibers and elastomeric binder are mixed and formed into sheets between rolls. It may also be made by the well known beater-addition process which is described in detail in U.S. Pat. No. 2,759,813.

To demonstrate the enhanced ability of the gasket material of the present invention to provide a long term durable seal despite continuous exposure at elevated temperatures to hydrocarbon oil containing engine fluids and to show the ability of the present gasket material to effectively seal at very low flange loadings, swell pressure and sealability tests were conducted. A 75% by weight Kevlar-25% by weight Nordel EPDM (a sulfur curable elastomer based on ethylene, proplyene and 1,4 hexadiene and commercially available from the DuPont Company) gasket material of the present invention made by the conventional compressed process was compared with a commercially available high swell rubber designated as R/M F-53 which is asbestos fiber in a chloroprene-ethylene/propylene elastomeric binder.

EXAMPLE 1

Samples of each gasket material immersed in lubricating oil at 300° F. were placed between two flanges in which the compressive load can be continuously measured. Using equipment for measuring creep/relaxation it was possible to measure the maximum flange pressure created by each gasket. Room temperature pressure load for each gasket was about 20 psi.

The R/M F-53 gasket increased flange pressure as it swelled to about 78 psi at 40 hours, 88 psi at 80 hours, peaked at 89 psi at 90 hours and then decreased in load to 87 psi at 120 hours, 86 psi at 160 hours 84 psi at 200 hours and about 80 psi at 290 hours. This data correlates with field experience that presently available gasket materials provide a good initial seal but that binder degradation caused by prolonged contact with hydrocarbon oil results in high mileage failures.

The gasket material of the present invention increased flange pressure as it swelled to about 57 psi at 40 hours, 78 psi at 80 hours, 95 psi at 120 hours, 104 psi at 160 hours, 105 psi at 200 hours, 106 psi at 290 hours, and appeared to be continuing to increase pressure load slowly with continued exposure. There was no evidence of degradation or loss or sealing pressure using the EPDM binder of the present invention.

Example 2

Samples of each gasket material were subjected to leakage rate testing using the standard ASTM sealability fixture. The hydrocarbon oil test fluid was diesel fuel. Each test specimen was coated with diesel fuel prior to assembly and allowed to remain overnight in the fixture before applying the 20 psi external test pressure. The initial leakage rate, defined to be the average leakage rate for the first hour, and the final leakage rate, defined to be the average leakage rate for the 24 hour test period, was determined for each sample and the results are set forth below:

| material | Leakage (ml/hr) at 20 psi | |
|---|---|---|
| | Initial | Final |
| Kevlar + EPDM | .025 | .005 |
| R/M F-53 | .025 | .027 |

This comparison clearly shows that upon swelling the leakage rate of the gasket material of the present invention, even at very low flange pressure, decreased markedly to a negligible rate. By contrast, the leakage rate of the commercially available gasket material increased over the test period.

INDUSTRIAL APPLICABILITY

High compressive strength, high temperature resistant gasket materials which provide excellent sealing at low flange pressures and which provide long term reliable performance in severe chemical environments find broad applicability in internal combustion engines of all types. Particularly in applications such as head gaskets, water pump and other coolant system gaskets, fuel pump and other fuel system gaskets, oil pan gaskets, valve cover gaskets, and the like, the gasket material is continuously exposed to hydrocarbon oil containing fluids. Various high swell fibrous-elastomeric gasket materials have been found to provide effective seals over the short term but all have exhibited markedly reduced effectiveness over the long term after prolonged exposure to hydrocarbon oil containing engine fluids. Fibrous gaskets including an ethylene propylene rubber binder, desirably an EPDM binder, have been found to swell, which confers an enhanced ability to seal at low flange pressure, but not degrade upon prolonged exposure to hydrocarbon oil containing engine fluids. It is this unique property together with its high temperature capability, low compression set and good environmental resistance which makes ethylene propylene rubber-fibrous gaskets particularly useful in diesel and other internal combustion engines.

I claim:

1. An internal combustion engine employing hydrocarbon oil containing fluids, comprising
   a first engine part having a first gasket engaging face;
   a second engine part having a second gasket engaging face, said second part located adjacent said first engine part for defining a gasket receiving space between said first and second gasket engaging faces;
   at least one of said engine parts being formed to allow the gasket receiving space to be exposed to the hydrocarbon oil containing fluid;
   biasing means for maintaining said first and second gasket engaging faces in a fixed position while subjecting material filling said gasket receiving space to a flange pressure at least as high as 10,000 psi;
   said first and second gasket engaging faces allowing a non-fibrous ethylene propylene gasket filling said gasket receiving space to be extruded out of said space upon application of a gasket compressive force less than 10,000 psi; and
   a gasket positioned between and in contact with said first and second gasket engaging faces in a manner allowing contact with the hydrocarbon oil containing fluids, said gasket comprising a fibrous material and an ethylene propylene rubber binder therefor and formed by a non-latex, compressed process in which non-latex ethylene propylene rubber binder in excess of 10 percent by weight and fibrous material in excess of 50 percent by weight are mixed and compressed into a sheet which when cured is capable of filling said gasket receiving space when placed therein and of preventing extrusion out of said gasket receiving space when said biasing means applies a gasket compressive force as high as 10,000 psi.

2. An engine, as claimed in claim 1, wherein said fibrous material comprises about 75% by weight of said gasket.

3. An engine, as claimed in claims 1, wherein said fibrous material is selected from the group consisting of mineral fibers, cellulosic fibers, glass fibers, polymeric fibers and mixtures thereof.

4. An engine, as claimed in claim 3, wherein said fibrous material comprises from 50 to 90% by weight of said gasket.

5. An engine, as claimed in claim 4, wherein said fibrous material includes asbestos.

6. An engine, as claimed in claim 4, wherein said fibrous material includes poly(p-phenylene terephthalamide).

* * * * *